Oct. 2, 1928.

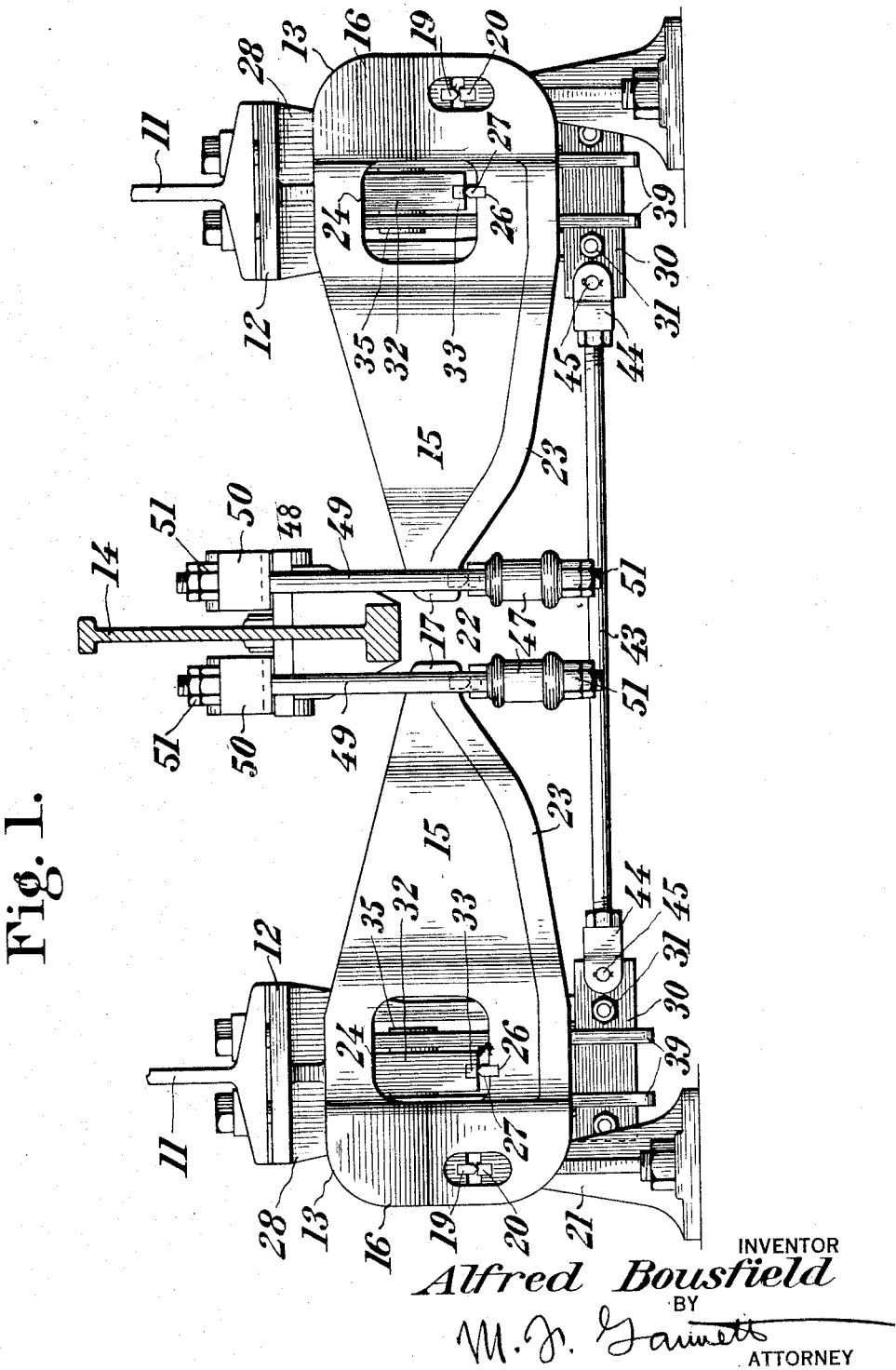

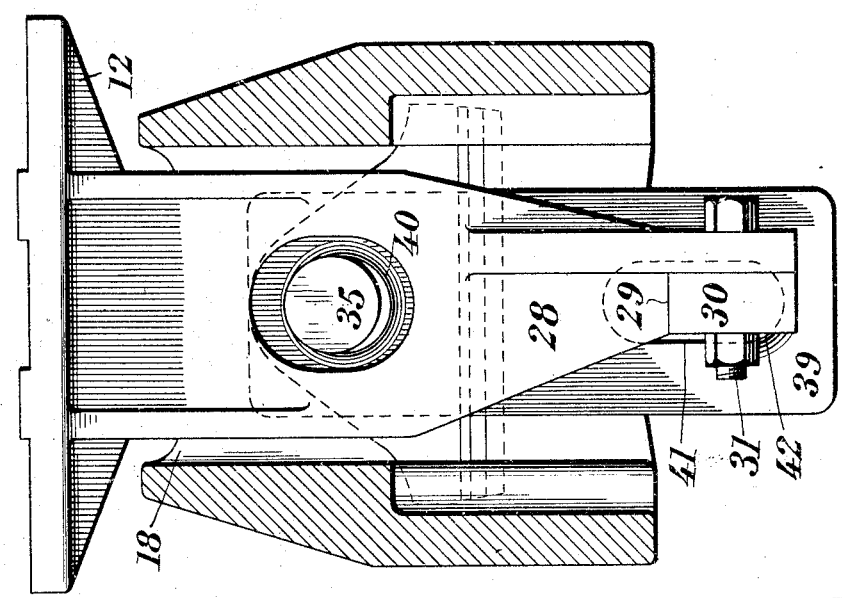
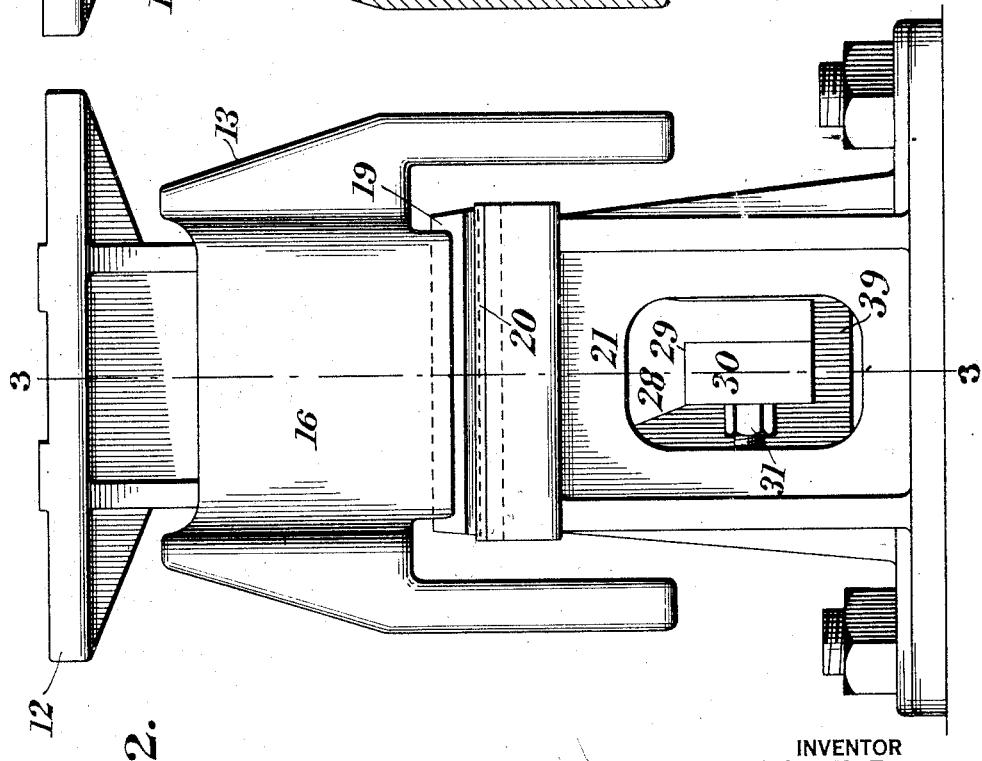

A. BOUSFIELD 1,685,978

TRACK SCALE

Filed July 21, 1926

INVENTOR
Alfred Bousfield
BY
M. J. Gannett
ATTORNEY

Oct. 2, 1928.
A. BOUSFIELD
TRACK SCALE
Filed July 21, 1926
1,685,978
7 Sheets-Sheet 4
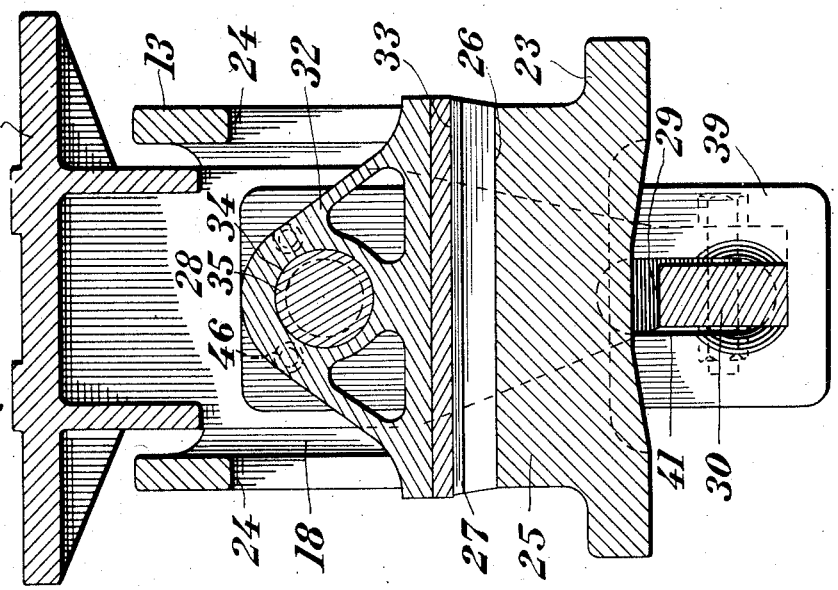
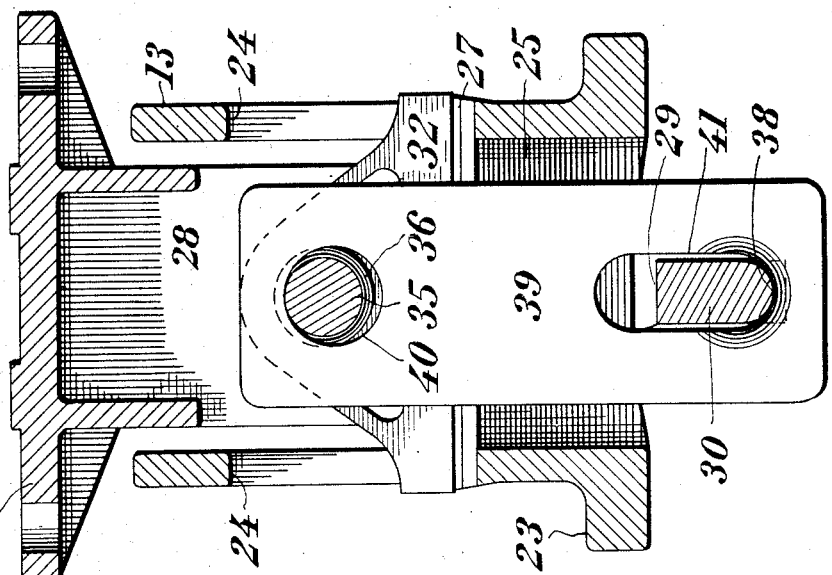
INVENTOR
Alfred Bousfield
BY
M. F. Gannett
ATTORNEY

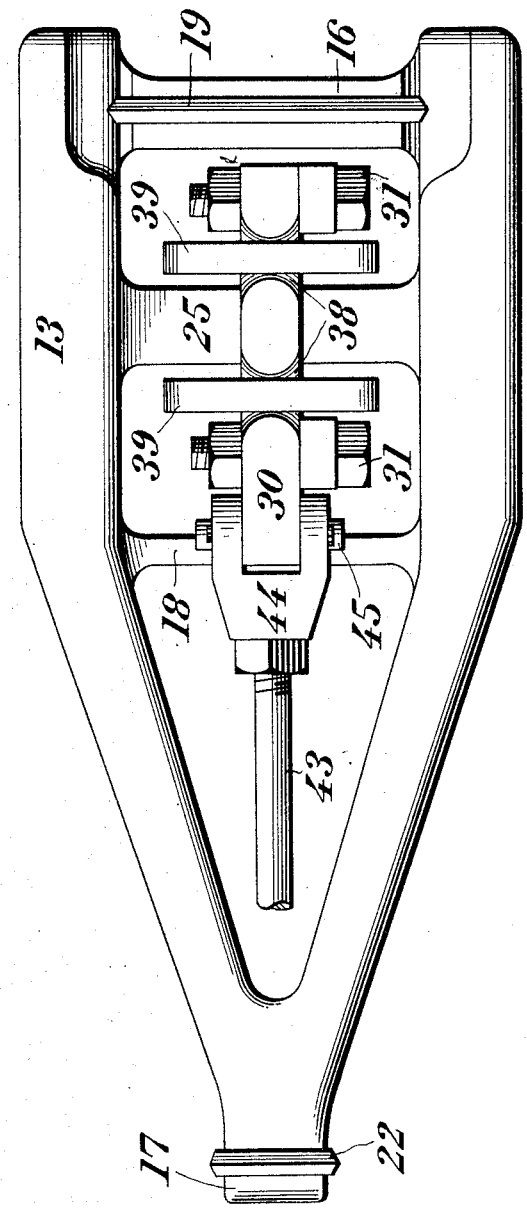

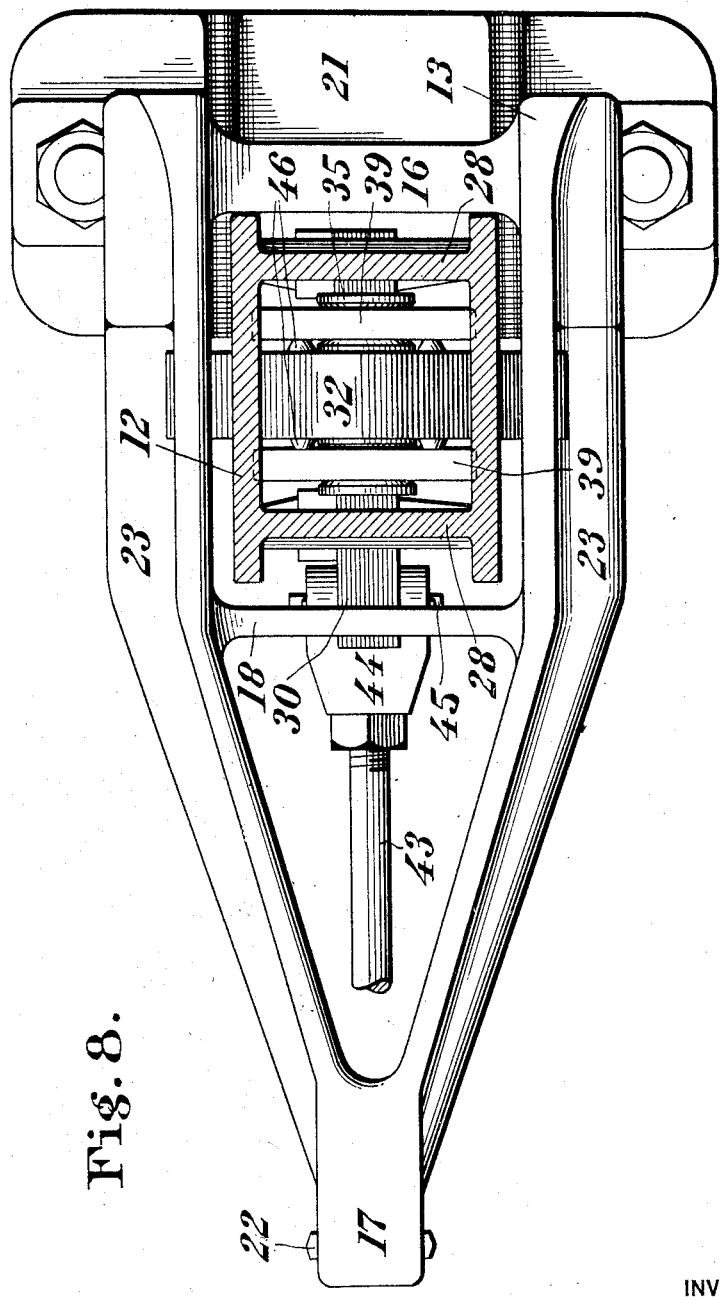

Oct. 2, 1928.

A. BOUSFIELD 1,685,978

TRACK SCALE

Filed July 21, 1926 7 Sheets-Sheet 7

INVENTOR
Alfred Bousfield
BY
ATTORNEY

Patented Oct. 2, 1928.

1,685,978

UNITED STATES PATENT OFFICE.

ALFRED BOUSFIELD, OF ST. JOHNSBURY, VERMONT, ASSIGNOR TO E. AND T. FAIRBANKS AND COMPANY, OF ST. JOHNSBURY, VERMONT, A CORPORATION OF VERMONT.

TRACK SCALE.

Application filed July 21, 1926. Serial No. 123,908.

This invention relates to heavy duty scales of the type shown by United States Patent No. 1,182,073 granted May 9, 1916 on an application filed by me.

The prime object of this invention is to provide improved means for suspending the girder chairs of a scale platform from the main scale levers whereby such chairs and their associated parts will be free to move in a plurality of planes without producing torsional strains in the levers.

Another object is to provide means for compensating for the end or side thrust caused by a vehicle or other movable object passing onto or off of the platform.

Other objects and advantages will be in part apparent from and in part noted hereinafter in connection with the following description of an exemplary but preferred embodiment of the invention shown in the accompanying drawings, in which—

Figure 1 is an end view of a scale constructed in accordance with my invention, showing a pair of main levers in side elevation, and an extension lever in cross section, parts of the scale platform being omitted;

Fig. 2 is an end view of one of the main levers and associated parts;

Fig. 4 is a vertical transverse section taken on the line 4—4 of Fig. 3;

Figure 3:
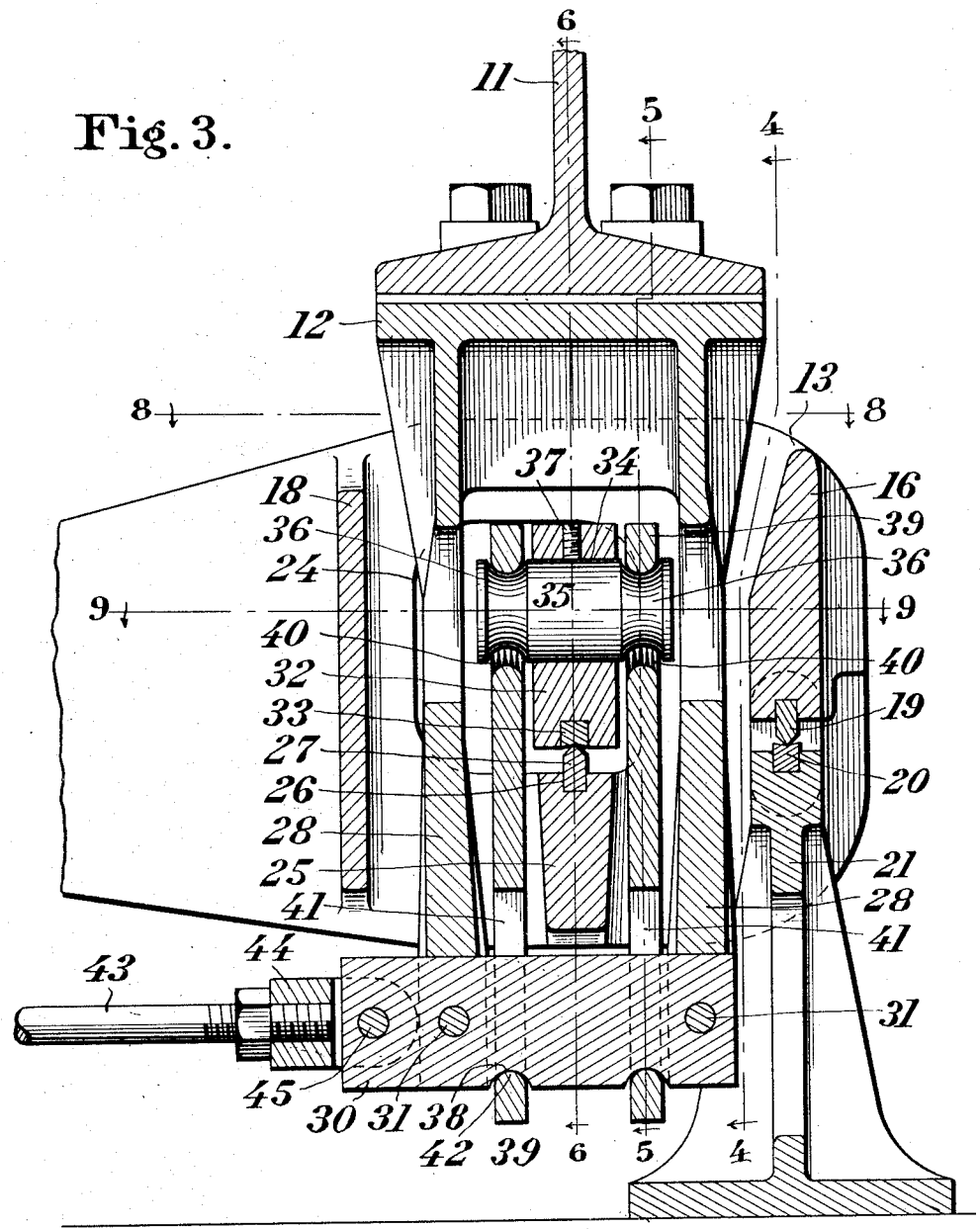
Fig. 3 is a vertical section taken on the line 3—3 of Fig. 2.

Figs. 5 and 6 are similar views taken respectively on the lines 5—5 and 6—6 of Fig. 3;

Fig. 7 is an inverted plan of one of the main levers, and

Figure 9:
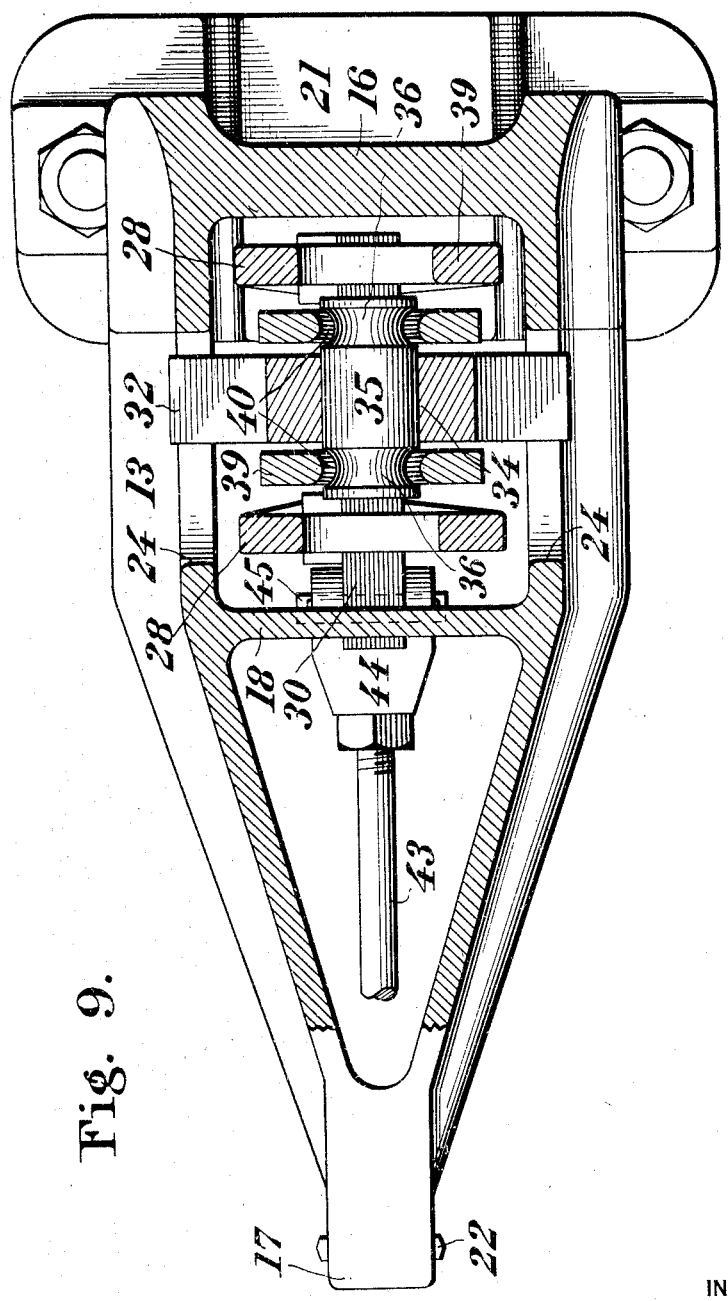

Figs. 8 and 9 are horizontal sections taken on the lines 8—8 and 9—9 respectively of Fig. 3.

Referring now to the illustrated embodiment of the invention shown in the accompanying drawings, load stresses are transmitted from girders 11 of the scale platform, through chairs 12 to a pair of main levers 13. From the main levers, the load stresses are transmitted to an extension lever 14.

Each main lever comprises spaced side walls 15 which are integrally connected to provide a rear or butt end 16, and a front or tip end 17, such walls being also connected by a vertically disposed web 18.

Mounted in the butt 16 of each lever is a depending knife edge pivot 19 adapted to seat in a concaved bearing 20 carried by the upper end of a stand 21. Likewise, the tip 17 of each main lever is provided with a depending knife edge pivot 22, that is adapted to co-operate with suitable means, to be described, whereby load stresses will be transmitted from the main levers to the extension lever 14.

In order that each main lever can withstand excessively heavy load stresses, the butt 16 thereof is made considerably wider than the tip 17, and the pivots 19 and 22 have a length substantially corresponding to the width of the portion of the lever in which they are mounted (see Fig. 7). The side walls 15 are formed parallel with each other adjacent the butt end of the lever, and in the forward part of the lever, these walls merge towards the narrower tip 17. By referring to Fig. 1 it will be noticed that each side wall 15 is, in side elevation, somewhat triangular in outline, with the deepest part extending downwardly at the butt 16. In this manner the rear or load receiving portion of the lever will be suitably reinforced, and in the present instance such reinforced portion includes the part of the lever having the parallel side walls. As shown, the web 18 is preferably located forward of this portion of the lever.

The side walls of each main lever are constructed with a relatively thin vertical web around the lower edge of which is a flange 23. This flange merges with the butt at one end and also merges with the tip at the other end, the construction being such that a unitary structure is formed, which structure is reinforced to provide a load transmitting member of great strength.

Alined rectangular openings 24 are formed in the parallel side walls 15 forward of the butt 16. A transverse web 25, that is formed integral with the lever, connects its spaced side walls, the top of the web being flush with the lower edge of the openings 24. The web 25 has a channel 26 formed longitudinally in its upper face for the reception of a knife edge pivot 27, which is tightly fixed therein. By this construction, there is provided a relatively long load pivot that spans the spaced side walls of the main lever, such pivot being adapted to support the girder chairs 12 in a manner to be presently described.

Each girder chair 12 comprises a casting having spaced depending legs 28 that are disposed in the opening defined by the spaced side walls 15, the butt 16 and the web 18 of the lever. The legs straddle the pivot 27 and other associated parts to be described, and their extremities are provided with notches 29 arranged to engage a rectangular bar 30 that is positioned under each main lever and disposed along the longitudinal center line thereof. Bolts 31 are used to attach the bar to the legs of the girder chair.

The bar 30 is suspended from the pivot 27 of the main lever. For this purpose use is made of a block 32 having a concaved bearing 33 for engaging the pivot 27. The bearing is made approximately as long as the length of the pivot, and, as shown by Fig. 6, the ends of the block project through the openings 24 in the side walls of the lever.

The block 32 is substantially of triangular shape in side elevation, and formed transversely near the apex thereof is a relatively large annular opening 34. When the parts are being assembled, the block is so positioned in the lever that the center of the opening 34 will coincide with the longitudinal axis of the lever.

A cylindrical pin 35, having a pair of spaced annular concaved grooves 36 formed near its ends, is tightly mounted in the opening 34, and, as shown by Fig. 3, the pin is retained in proper position by means of a set-screw 37. The purpose of the pin is to provide trunnions on which the means for suspending the bar 30 are mounted, such means being disposed in the grooves 36, and therefore the parts are so constructed that when the pin is positioned in the block, each of the grooves 36 will be disposed adjacent to the side walls of the block but will be spaced therefrom a distance sufficient to prevent the suspension means from contacting with the block. Also formed in the bottom of the bar 30, and spaced apart a distance corresponding to the distance between the grooves 36, is a pair of concaved grooves 38.

Perforated loops 39 are used for suspending the bar 30 from the block 32. These loops are similarly formed, and near the top of each is an annular opening 40 that is slightly larger than the diameter of the pin 35 so that the loop can be readily passed over the end of the pin and be seated in the groove 36. In order to provide a suitable bearing surface for the portion of the loop carried by the pin, the periphery of the opening 40 is made convexed. Near the bottom of each loop there is an elongated opening 41 that is made large enough to permit insertion of the bar 30. The lower portion of the opening 41 is formed with a convexed bearing surface 42. The curvature of the convexed bearing surfaces formed in the perforated loop is of less radius than the curvature of the concaved bearing portions formed in the block 32 and the bar 30 so as to provide a line contact between the several parts, thereby reducing friction to a minimum, and also permitting the parts to oscillate with respect to each other without interference.

It is to be noted that the loops 39 are disposed equidistantly on each side of the pivot 27, being spaced from the block by lugs 46. These loops lie transversely of the longitudinal center line of the lever, and due to the positioning of the bar 30 directly beneath the center of the pin 35 and in alinement therewith, the downward pull exerted by the loops will coincide to the center plane of the lever.

The construction described provides, in effect, a universal joint between the girder chairs and the main levers. The scale platform will be suspended from the levers in such a manner that the supporting means will have a two-way tilting movement, the loops 39 swinging laterally of the levers through the pins 35, and the bars 30 will readily swing in a plurality of planes from the loops 39, as will be understood. In this way, means are provided for compensating for the end or side thrust caused by a vehicle or other movable object passing onto or off of the platform, and also for any deflection in the girders caused by an imposed load on the platform. It is to be noted that due to the pivotal mounting of the girder chair suspension means the block 32 remain stationary on the pivots 27 irrespective of the movements partaken of by the loops 39 and the bars 30. In view of this it will be readily apparent that undue wear of the knife edges of the pivots 27 is prevented.

In order to stabilize the girder chairs 12 of each pair of alined levers, the bars 30 are connected by a rod 43. The ends of the rod may be provided with adjustable yokes 44 that can be connected to the bars by any suitable means, such as the pins 45 shown in Figs. 1 and 3. The use of the rod 43 will not interfere with the freedom of adjustment of the suspension means in each lever, but will prevent undue oscillation of the loops 39 and associated parts.

For the purpose of transmitting load stresses from the free ends of the main levers to the extension lever 14, use is made of bearing blocks 47 in which are seated the pivots 22 of the main levers. The blocks 47 are suspended from a transverse pivot 48 of the extension lever by adjustable bolts 49. The top of the bolts are mounted in bearing blocks 50 seated on the pivot 48 and nuts 51 are screwed on the ends of the bolts and bear against the blocks. The connection described provides ready adjustment of the parts and permits easy replacement when desired.

The functional and structural objects above stated are thus seen to be obtained in the construction described. It is to be understood that certain features of the invention are capable of modification and combination in scales of other types without sacrifice of the attendant advantages.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having thus described my invention, what I claim as new and desire to secure by Letters Patent is:—

1. In a scale, the combination with a lever having a vertical opening formed therein and a pivot spanning said opening, of a substantially triangular block mounted on said pivot and having oppositely projecting bearings near the apex thereof, a girder chair having legs straddling said block, and means suspended from the bearings in the said block for supporting the said chair.

2. The combination with a scale lever having a vertical opening formed therein and a pivot spanning said opening, of a girder chair having depending legs straddling said pivot and terminating below the bearing edge thereof, and means for suspending the girder chair from the said lever pivot, said means including a substantially triangular block mounted on said pivot and flexibly connected to said chair whereby said chair can readily swing in a plurality of planes.

3. In a scale, the combination with a pair of levers having load transmitting means suspended therefrom, of girder chairs having depending legs straddling said means, bars fastened to the ends of said legs, and a rod flexibly connected to the said bars.

4. In a scale, the combination with a pair of levers having load transmitting means suspended therefrom, of girder chairs having depending legs straddling said means, bars fastened to the ends of the said legs, said bars being pivotally connected to said load transmitting means and a rod flexibly connected to the said bars.

5. A pivot block for scales having the configuration of a triangle and carrying opposed bearings near its apex.

6. The combination with a scale lever having a vertical opening formed therein and a knife edge pivot spanning said opening, of load transmitting means disposed in the lever opening and having an operative connection with said pivot, said means including a substantially triangular block mounted on said pivot and a girder chair supporting bar suspended from the block by means movable in a plurality of planes.

ALFRED BOUSFIELD.